(12) United States Patent
Javan Roshtkhari et al.

(10) Patent No.: US 12,132,974 B2
(45) Date of Patent: Oct. 29, 2024

(54) SYSTEM AND METHOD FOR MODEL DRIVEN VIDEO SUMMARIZATION

(71) Applicant: Sportlogiq Inc., Montreal (CA)

(72) Inventors: Mehrsan Javan Roshtkhari, Beaconsfield (CA); Evin Keane, Montreal (CA); Philippe Desaulniers, Mont-Saint-Hilaire (CA); Luke Carey Bornn, Sacramento, CA (US)

(73) Assignee: Sportlogiq Inc., Montreal (CA)

( * ) Notice: Subject to any disclaimer, the term of this patent is extended or adjusted under 35 U.S.C. 154(b) by 331 days.

(21) Appl. No.: 17/445,354

(22) Filed: Aug. 18, 2021

(65) Prior Publication Data

US 2021/0392414 A1   Dec. 16, 2021

Related U.S. Application Data

(63) Continuation of application No. PCT/CA2020/050224, filed on Feb. 21, 2020.
(Continued)

(51) Int. Cl.
*H04N 21/8549* (2011.01)
*G06V 20/40* (2022.01)
(Continued)

(52) U.S. Cl.
CPC ......... *H04N 21/8549* (2013.01); *G06V 20/41* (2022.01); *G06V 20/47* (2022.01);
(Continued)

(58) Field of Classification Search
CPC ......... H04N 21/8549; H04N 21/23418; H04N 21/252; H04N 21/4781; H04N 21/44213;
(Continued)

(56) References Cited

U.S. PATENT DOCUMENTS 10,102,430 B2 * 10/2018 Vunic ............... G06V 20/49
10,311,913 B1 * 6/2019 Shekhar ............ G06V 20/41
(Continued)

FOREIGN PATENT DOCUMENTS

WO   2017201608 A1   11/2017
WO   2018126323 A1   7/2018

OTHER PUBLICATIONS

Supplemental European Search Report issued in corresponding European Patent Application No. EP20759797; search completed Aug. 22, 2022.
(Continued)

*Primary Examiner* — Bobbak Safaipour
(74) *Attorney, Agent, or Firm* — CPST Intellectual Property Inc.; Filip Boskovic; Brett J. Slaney

(57) ABSTRACT

There are provided methods and systems to generate a summary of a video by decomposing the video into segments automatically, where each segment has a quantitative score. The assigned scores to those segments can be generated using models that are quantitatively describing and/or evaluating the individual or group activities of the objects in the scene. The segments can be grouped based on their scores to generate a video summary. In an implementation, such a system can generate video summaries of a game based on the quantitative game models. Using a game model that assigns values to different game events and actions in a game, a set of most interesting, least interesting and neutral plays can be identified in the video and a highlight or lowlight reel generated. With adjusting the valuation of player actions and game events based on their impact on the game's result, the monotony in highlight reels can be avoided. The video segments can also be used to generate a playlist of the different plays in game ordered based on their assigned scores.

17 Claims, 10 Drawing Sheets

Related U.S. Application Data

(60) Provisional application No. 62/809,240, filed on Feb. 22, 2019.

(51) Int. Cl.
    *H04N 21/234*    (2011.01)
    *H04N 21/25*     (2011.01)
    *H04N 21/478*    (2011.01)

(52) U.S. Cl.
    CPC ....... *G06V 20/49* (2022.01); *H04N 21/23418* (2013.01); *H04N 21/252* (2013.01); *H04N 21/4781* (2013.01)

(58) Field of Classification Search
    CPC ...... H04N 21/845; G06V 20/41; G06V 20/47; G06V 20/49
    See application file for complete search history.

(56) References Cited

U.S. PATENT DOCUMENTS

| | | | | |
|---|---|---|---|---|
| 10,723,018 | B2* | 7/2020 | Griffin | A47L 11/4011 |
| 11,297,388 | B2* | 4/2022 | Menendez | H04N 21/8456 |
| 11,582,536 | B2* | 2/2023 | Packard | H04N 21/4667 |
| 11,836,181 | B2* | 12/2023 | Saggi | G06F 16/739 |
| 2008/0269924 | A1* | 10/2008 | Huang | G06F 16/739 434/247 |
| 2009/0080853 | A1* | 3/2009 | Chen | G06F 16/786 386/242 |
| 2013/0326406 | A1* | 12/2013 | Reiley | G06F 3/048 707/723 |
| 2014/0189517 | A1* | 7/2014 | Hughes | A63F 13/828 715/719 |
| 2015/0312652 | A1 | 10/2015 | Baker et al. | |
| 2016/0247328 | A1 | 8/2016 | Han et al. | |
| 2017/0103264 | A1 | 4/2017 | Javan Roshtkhari et al. | |
| 2017/0255827 | A1 | 9/2017 | Chang et al. | |
| 2017/0323178 | A1* | 11/2017 | Kwatra | G06V 20/42 |
| 2017/0337271 | A1 | 11/2017 | Lee et al. | |
| 2018/0020243 | A1 | 1/2018 | Ni et al. | |
| 2018/0132011 | A1 | 5/2018 | Shichman et al. | |
| 2018/0295428 | A1 | 10/2018 | Bi et al. | |
| 2019/0013047 | A1* | 1/2019 | Wait | G11B 27/002 |
| 2019/0091541 | A1* | 3/2019 | Schulte | A63B 71/06 |
| 2020/0372066 | A1* | 11/2020 | Saggi | G06N 20/00 |
| 2023/0421516 | A1* | 12/2023 | Murrone | H04L 51/18 |

OTHER PUBLICATIONS

Gudmundsson, Joachim et al: "Spatio-Temporal Analysis of Team Sports", ACM Computing Surveys, ACM, New York, NY, US, vol. 50. No. 2, Apr. 11, 2017 (Apr. 11, 2017), pp. 1-34, XP058666360, ISSN: 0360-0300, DOI: 10.1145/3054132 *pp. 23-27*.

Raventos, Arnau et al: "The importance of audio descriptors in automatic soccer highlights generation", 2014 IEEE 11th International Multi-Conference on Systems, Signals & Devices (SSD14), IEEE, Feb. 11, 2014 (Feb. 11, 2014), pp. 1-6, XP032592412, DOI:10.1109/SSB.2014.6808845 [retrieved on Apr. 30, 2014] * p. 4, right-hand column*.

Sasongko, Johannes: "Automatic generation of effective video summaries", Jan. 1, 2011 (Jan. 1, 2011), XP055297515, Retrieved from the Internet: URL:http://eprints.qut.edu.au/45473/1/Johannes_Sasongko_Thesis.pdf *the whole document*.

International Search Report issued in corresponding PCT Application No. PCT/CA2020/050224; search completed May 8, 2020.

Gramacy, Robert B.; Taddy, Matt and Tian, Sen; Estimating player contribution in hockey with regularized logistic regression; Journal of Quantitative Analysis in Sports, 9(1).

MacDonald, Brian; An Improved Adjusted Plus-Minus Statistic for NHL Players; MIT Sloan Sports Analytics Conference, 2011.

Cervone, Dan; D'Amour, Alexander; Bornn, Luke; Goldsberry, Kirk; "Pointwise: Predicting points and valuing decisions in real time with NBA optical tracking data", 8th Annual MIT Sloan Sports Analytics Conference, Feb. 2014.

Liu, Guiliang and Schulte, Oliver; Deep reinforcement learning in ice hockey for context-aware player evaluation; IJCAI-ECAI-18, 2018.

Pettigrew, Stephen; Assessing the offensive productivity of NHL players using in-game win probabilities; MIT Sloan Sports Analytics Conference, 2015.

Schulte, Oliver; Khademi, Mahmoud; Gholami, Sajjad; Zhao, Zeyu; Javan, Mehrsan and Desaulniers, Philippe; A Markov game model for valuing actions, locations, and team performance in ice hockey; Data Mining and Knowledge Discovery, 31(6):1735-1757.

Schulte, Oliver, Zhao, Zeyu, Javan, Mehrsan, and Desaulniers, Philippe; Apples-to-apples: Clustering and ranking NHL players using location information and scoring impact; MIT Sloan Sports Analytics Conference, 2017.

Raventos et al., "Automatic summarization of soccer highlights using audio-visual descriptors". SpringerPlus, 2015, vol. 4 (301), pp. 1-19, [online] [retrieved on May 8, 2020 (May 8, 2020)].

* cited by examiner

Code for minimum entropy requirement

```
import pandas as pd
n_highlights = 10
H_threshold = 1.0 # Minimum required entropy

# Sort events by their adjusted impact, greatest first.
events = sorted(events, key=lambda h: h['i_adj'], reverse=True)
highlights = events[:n_highlights]

new_entry_idx = n
while True:
    H = entropy(pd.value_counts([h['type'] for h in highlights]).values)
    if H < H_threshold:
        # Entropy threshold not met.
        # Modify the highlight reel by introducing the event with next-highest
        # value in place of whichever event causes the greatest increase to the new H.
        new_highlight_entry = events[new_entry_idx]
        max_new_H = H
        i_max_new_H = None
        for i in range(n_highlights):
            new_highlights = [h for j, h in enumerate(highlights) if j != i else new_highlight_entry]
            new_H = entropy(pd.value_counts([h['type'] for h in new_highlights]).values)
            if new_H > max_new_H:
                i_max_new_H = i
                max_new_H = new_H
        if i_max_new_H is None:
            continue
        else:
            # Maximize the highlight reel entropy.
            highlights[i_max_new_H] = new_highlight_entry new_entry_idx += 1
        if new_entry_idx >= len(events):
            print('Events have been exhausted without meeting entropy requirement.')
            break
    else:
        print('Found a set of highlights which meet entropy requirement.')
        break
```

FIG. 10

SYSTEM AND METHOD FOR MODEL DRIVEN VIDEO SUMMARIZATION

CROSS-REFERENCE TO RELATED APPLICATION(S)

This application is a Continuation of PCT Application No. PCT/CA2020/050224 filed on Feb. 21, 2020, which claims priority to U.S. Provisional Patent Application No. 62/809,240 filed on Feb. 22, 2019, the contents of which are incorporated herein by reference in their entirety.

TECHNICAL FIELD

The following relates to systems and methods for model-driven summarization, particularly for generating video summaries based on computational models describing and evaluating the behaviors of entities and objects in a video.

BACKGROUND

It is found that state-of-the-art video summarization and highlight generation in sports may mostly rely on recognizing audio and visual saliency or surprises, such as visual abnormalities summarization, only based on visual similarity/dissimilarity and surprises—see reference [8]. In games and sports, this approach often points to obvious highlight events such as shots and goals. The following discloses a method of generating "segments of interest" in videos for different applications such as video summarization and video segment recommendations based on content similarity, using a stochastic model-derived metric that evaluates and assigns a numeric value to the individual or group activities of the objects in the scene, thereby identifying video segments and assigning quantitative values to each video segment.

This approach allows for summarizing a video based on a given objective. For example, this method can be applied to games and generate a "highlight" and "lowlight" reel, depending on which events are in focus, the ones that have a high value or the ones that have low values. The exemplary embodiment is described for ice hockey which automatically extracts highlight reel video for high-impact actions including shots and goals but also passes, checks, and loose puck recoveries.

In reference [5], distinctions are made between the values of events such as goals based on their importance given the game context in which they occur, a concept which is applicable here in highlight extraction as much as player performance evaluation. In references [7] and [6], the game is described as a Markov chain with rewards in goal states, with k-nearest-neighbors clustering used to define states based on event location. This allows each state to be assigned a value based on its likelihood of leading to a goal for or against each team.

In reference [4], this approach is advanced to incorporate continuous signals using a possession-based LSTM. Reference [3] applies a probabilistic model to optical tracking data in basketball to evaluate every instant in a possession in basketball in terms of the number of points each possession is likely to generate. This model accounts for the locations of all players. The data required for such models is becoming more granular and more widely available, particularly with the advent of optical tracking data. In NFL, LOESS has been used to evaluate the game state based on down-distance-field position in reference [2]. The approach in reference [1] evaluates a player's contribution to goals based on a goal-scoring prediction model, moving beyond the marginal effect measured by popular plus-minus statistics to a more useful partial effect measurement. This same prediction model can be used to evaluate either team's state.

It is an object of the following to address at least one of the above-noted considerations.

SUMMARY

One aspect of the following can utilize a method for game evaluation that updates over time, whether by evaluating game states, game events, or both. The game model can assign values to the actions, events, and interactions between the objects that are happening in a scene, thereby segmenting the videos according to its content and assigning a score to each segment. The variety of approaches to model interactions and group activities can be considered extensive.

The following relates to methods and systems to generate a summary of a video by decomposing the video into segments automatically, where each segment has a quantitative score. The assigned scores to those segments can be generated using models that are quantitatively describing and/or evaluating the individual or group activities of the objects in the scene. The segments can be grouped based on their scores to generate a video summary.

In an implementation, such a system can generate video summaries of a game based on the quantitative game models. Using a game model that assigns values to different game events and actions in a game, a set of most interesting, least interesting and neutral plays can be identified in the video and a highlight or lowlight reel generated. By adjusting the valuation of player actions and game events based on their impact on the game's result, the monotony in highlight reels can be avoided. The video segments can also be used to generate a playlist of the different plays in game order, based on their assigned scores.

In one aspect, there is provided a method for summarizing a video comprising: obtaining the video; extracting a plurality of features describing the events from the video; quantitatively evaluating the plurality of features according to at least one evaluation criterion; assigning one or more quantitative values to the events; generating segments in the video based on the quantitative values assigned to the events; and compiling a summary video using scores for the segments by aggregating a plurality of the quantitative values.

In another aspect, the method can further comprise: receiving information corresponding to individual player activities, team activities and game events, the location in space and time of the events or activities being generated automatically or manually; generating the quantitative values for the individual activities and game events; using the quantitative values of the events to generate performance metrics of the individual players and teams; generating segments in the videos based on the performance metrics and assign a score to each segment; and compiling the summary video using the scores for the segments.

In yet another aspect, the method can be configured for identifying important segments in videos for sport coaching, video recommendation and showing similar content, wherein each segment is separated based on one of the plurality of features describing the events in the video; further comprising obtaining a model that quantitatively evaluates the events based on their desired outcomes and assigns an impact score to each segment; and generating a playlist of the segments with similar content that have similar impact scores.

In other aspects, there are provided systems and computer readable media configured to perform the methods.

BRIEF DESCRIPTION OF THE DRAWINGS

Embodiments will now be described with reference to the appended drawings wherein:

FIG. 10 shows a coded example of an implementation for a 10-clip highlight reel with a minimum H threshold of 1.0.

DETAILED DESCRIPTION

The system described herein can use game context and the location of events (e.g., individual actuation, group activities and interactions) in order to learn the value of each action and event being done by players. The learnt game model provides information about the likely consequences of actions and hence, the video segments can be generated and evaluated based on their likely consequences. The basic model and algorithms can be adapted to study different outcomes of interest, and hence, the video segments can be scored differently so that one can identify similar segments, dissimilar segments, or the segments can be ordered based on their assigned relevance and impact scores. This exemplary embodiment also introduces event interest (EI), treating the interest of an event as a continuous function across time rather than a discrete instance. The following introduces cumulative event interest (CEI), the output of which provides a simple mechanism for extracting game highlights. The following demonstrates that this output can be readily modified depending on the type of highlights required by adjusting a limited, intuitive number of parameters of the CEI function.

Figure 1:
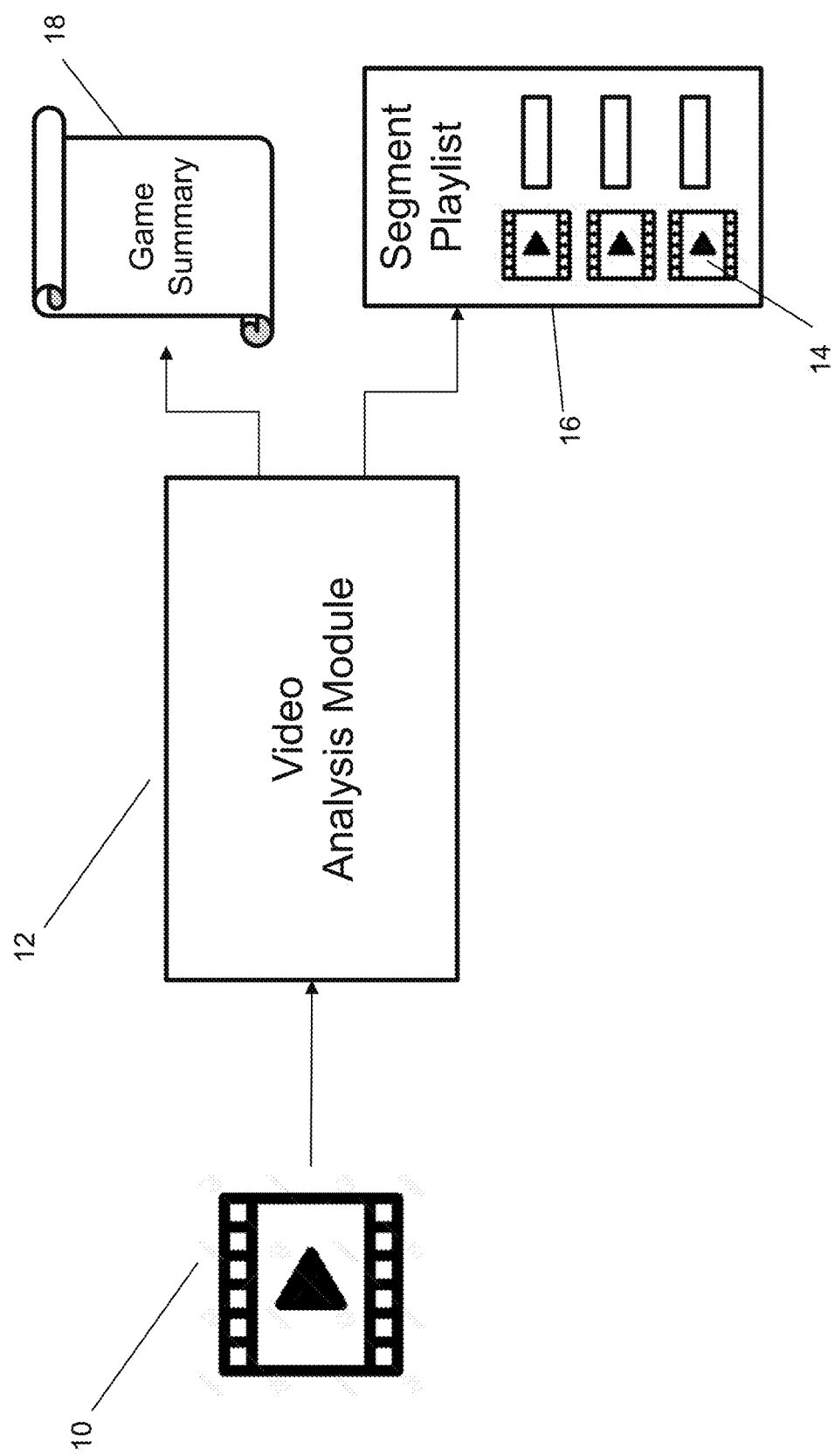
FIG. 1 is a schematic block diagram of a video analysis module.

Referring now to the figures, the following relates to methods and systems for summarizing videos based on the computational models describing and evaluating the behaviors of the people and objects in the video. The exemplary implementation, described herein and illustrated schematically in FIG. 1, generates a summary of the game (also referred to as a game summary 18) with a focus on the important moments in the game. This implementation generates video summaries 18 using game models for ice-hockey and certain aspects are directed to a specific sport for video summarization application and generating a playlist 16 of the important segments 14 of the games ordered based on their model-based assigned scores. The use-cases of isolating high and low-impact events need not be limited to media. The same clips could also be used to highlight a player's strengths and weaknesses to coaching staff in game reviews and in scouting.

Figure 2:
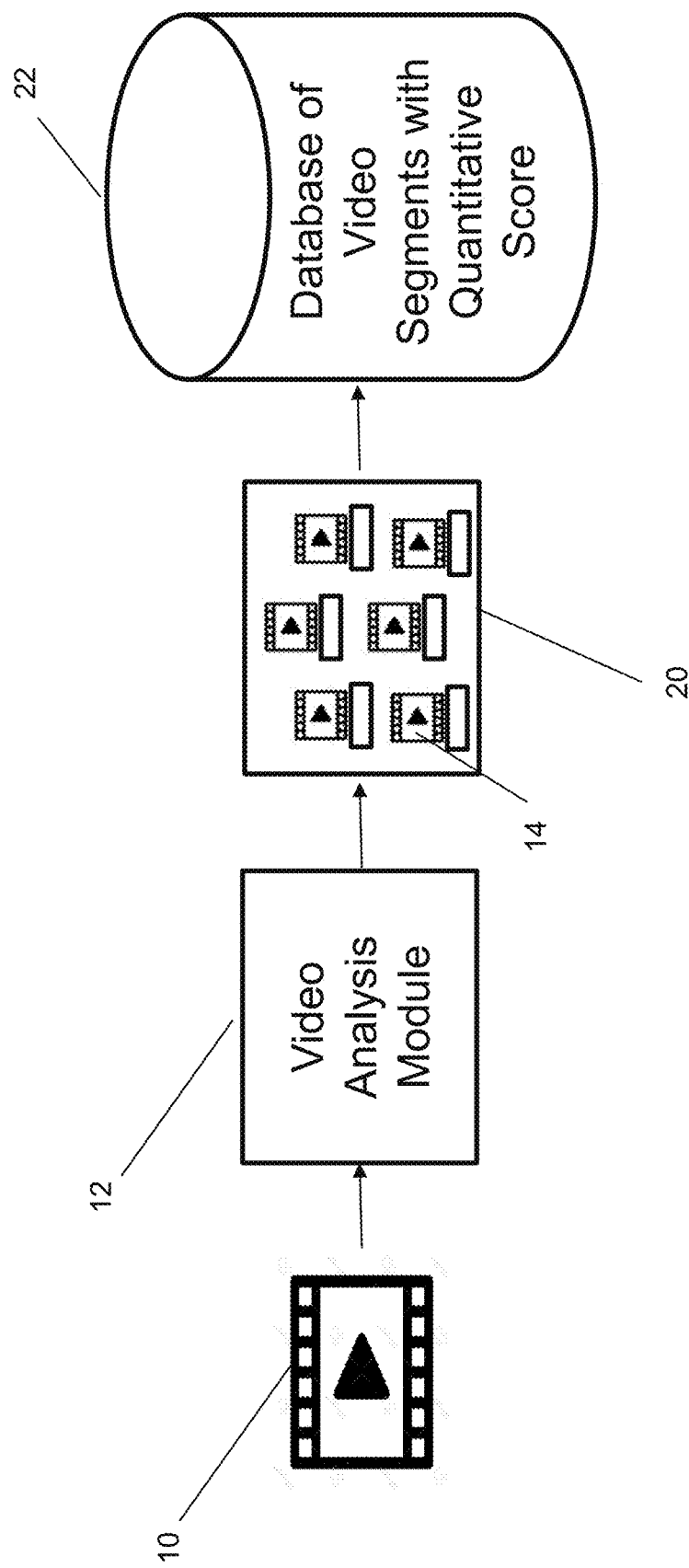
FIG. 2 is a schematic block diagram for a video analysis module configured to cut a video into segments, assign a quantitative score to the segments and store the segments in a database.

As shown in FIG. 2, the video analysis module 12 can also be configured to generate a number of individual segments 14 that can be stored in a database 22 of video segments 14, each with a quantitative score. Here, the video analysis module 12 is configured to cut the video 10 into segments 20 (i.e. an optional filtering process to select only segments that that have a specific score to populate the database), assign a quantitative score to the segments and store them in a database 22. The database can be queried for video segments that are similar based on their associated score, or have high or low score according to a metric defined by the user. Based on the scores, the segments can be selected to generate a summary of the input video 10. The database 22 can contain segments from several different videos. The database can be queried using a video segment as an input to find the most similar or dissimilar videos to the query in the database given the associated score with a segment.

Given the already existing methodologies to develop a game model that considers both space and time components of player locations and their actions and game events, one can use the Markov Game Models to assign values to the player's and team actions and game events. Below provides examples of how the game models can be used to generate a summary of a game by looking only at the most important (or unimportant) moments in the game guided by the game models.

Figure 3:
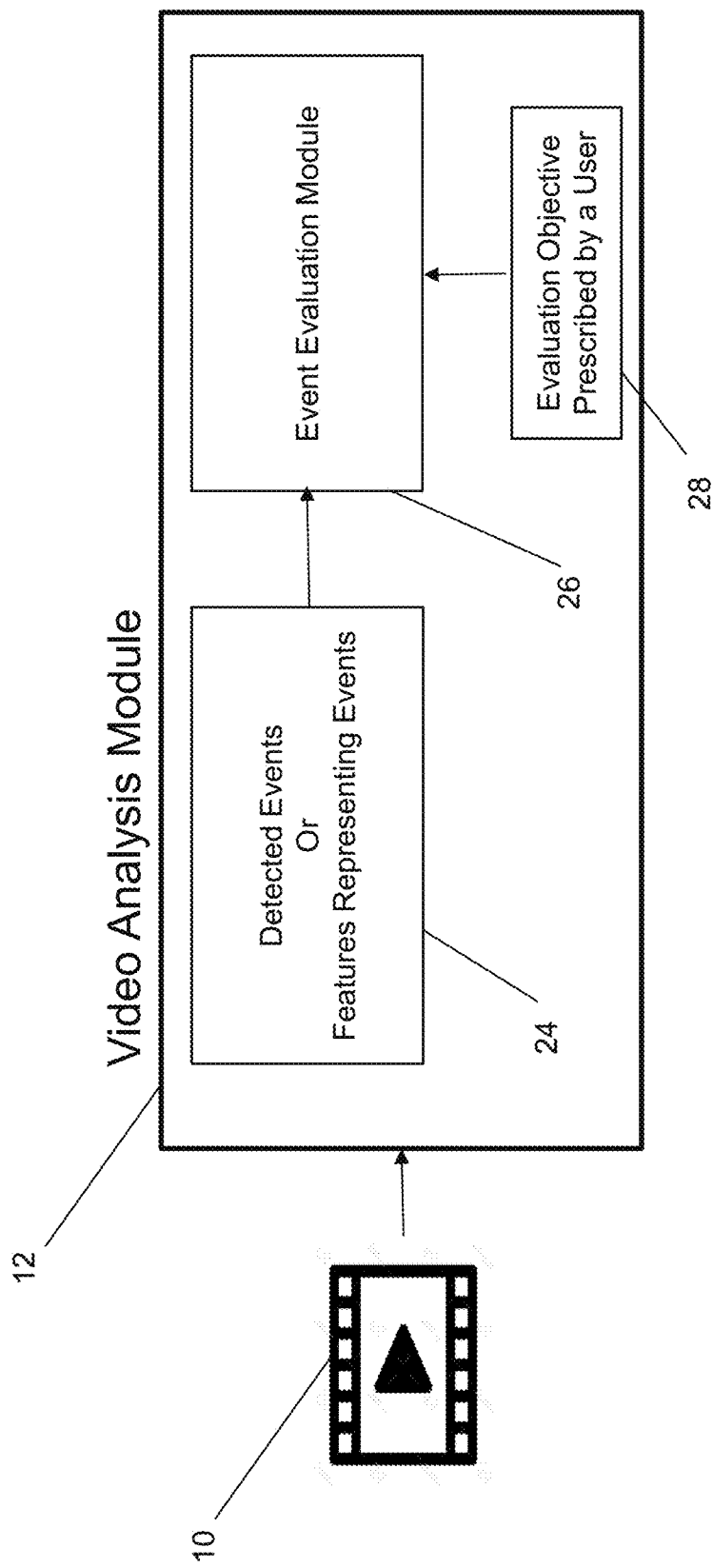
FIG. 3 is a schematic block diagram for a video analysis module utilizing detected events and an event evaluation module to assign a quantitative value to events or a sequence of events.

Referring also to FIG. 3, given an input video 10, the actions and interactions of the humans in the scene can be represented by a set of features 24. The features 24 can be automatically calculated from the pixel data to represent actions, events, and interaction of the people in the scene. Alternatively, the actions and events may be marked and identified manually. In this embodiment actions, interactions, and events are used interchangeably, more often referred to as events.

Once the events are determined or alternatively their representative features 24 calculated from the pixel data, the video 10 can be represented as a sequence of events in time. Using a decision evaluation model 26 such as a Markov Model or a Reinforcement Learning model, a quantitative value or score is assigned to every single event or a sequence of events. In the context of sport games, the values of the events can be related to an objective 28 that may set by a user, such as scoring a goal for a team or reducing the chance of getting a penalty for a team. As an example, if the objective is to attend to goals in a sport game, then the impact of every single event in the game on scoring the next goal for a team can be calculated using a game model. Some events may have a positive impact, negative impact or a neutral impact on scoring a goal.

This exemplary embodiment uses the Markov Models to formalize the ice hockey game and compute the values of states and actions during a game. After a game's individual events have been evaluated using a Markov Model or any other evaluation model such as mentioned previously, the next step is to determine which events resulted in large changes in value for either team, here referred to as the base or opposing teams.

The impact score for the base team, I(a), previously described in [7], is the difference between the change of values resulted from the action taken by the base and the opposing teams.

$$I(e) := (V_b(e) - V_b(e-1)) - (V_o(e) - V_o(e-1));$$

where $V_b(e)$ and $V_o(e)$ indicate the value of the action or the game event, e, taken by the base and opposing teams, respectively. If a team's impact is positive, the likelihood of that team scoring before the end of the play sequence has increased relative to that of their opponent. The opposite is true when a team's impact is negative.

Typically, the value of an event is tied in some way to the likelihood of each team scoring next, or the number of points a team is expected to score. In other words, the impact metric captures the effect that an event has on a team's likelihood of scoring next. However, depending on a game's context, the impact of an event may not have any effect on a game's outcome. For this reason, it's likely to be of far less interest to fans. The importance of an event's effect on a game's outcome is somewhat important in player evaluation and, in the past, adjustments have been made to some evaluation models to account for the importance of a score, for example in reference [5]. Often, however, the difficulty of executing a specific skill or making a certain decision may not increase much as the game's score changes. From the point of view of the fan, however, the importance of events becomes far greater the greater the effect it has on the game's outcome. The impact should therefore be adjusted to account for its likelihood of changing the game's ultimate result.

A simple in-game win probability model can enable the system to adjust the impact to reflect an action's performance given the context. The presently described in-game model uses league-wide even-strength zero score differential scoring rate combined with a game's remaining time in minutes to generate a Poisson distribution of score count for each team. These distributions, combined with a game's current score differential, are used to calculate win probabilities for each team.

For each event, the current win probability for each team can be calculated. Two further win probabilities are then calculated: one for if the base team is to score immediately, and another for if the opposing team is to score immediately. The difference between each of these and the actual current win probability represent the effect that scoring a goal would have for each team. This value increases when the game is close in score, especially near the end of the game, reflecting the contexts in which high and low quality events tend to be most exciting to fans.

The weighting of this effect can be applied to the event impact as follows:

$$I_{adj}(e) := (V_b(e) - V_b(e-1)) \times \Delta p_{wb} - (V_o(e) - V_o(e-1)) \times \Delta p_{wo}$$

The first term on the right represents the increase in home team win probability that results from the action. The second term on the right represents the increase in visitor team win probability that results from the action.

In addition to weighting more heavily towards events that occur in tense contexts, this adjustment also assigns higher rewards to players for making riskier plays near the end of the game when their team needs to score. For example, if the home team is losing by a goal with thirty seconds remaining, it may make a risky play that increases the opposing team's likelihood of scoring next more than its own. This would result in a negative I. However, the effect it has on the game's win probability may actually result in a positive $I_{adj}(e)$, because a goal for the home team in this context has a far greater effect on the win probability than a goal for the away team.

Aggregating Impact Values for Highlights:

A value is now associated with and can be assigned to each individual event in a game that reflects its potential interest to viewers. However, a highlight package consisting simply of the highest and lowest value events according to the $I_{adj}(e)$ would have several problems.

First, many sports include a wide variety of events, many of which require great skill to execute successfully, but some of which result in far higher impacts than others. In particular, a goal in soccer has a far higher impact than any other event in the game. But many other events, which have relatively less impact, require a similar amount of skill and are often of equal interest to fans. Excellent passes, tackles and take-ons all tend to have lower impact than goals and shots. To correct for this, a good highlight extraction framework should account not only for an event's $I_{adj}$, but should also make a variety of event types a priority.

Second, a compelling highlight does not always consist only of a single event. Often, several valuable events build on one another to result in a particularly valuable sequence of plays. A highlight may include one very high impact event, or it may include several reasonably high impact events in succession. Therefore, a methodology is required to determine what succession of events impacts within a timeframe merits inclusion in a highlight reel. The length of the clip itself should also be a function of the distribution of event impacts with respect to time, rather than each event impact being treated as discrete and independent of others that occur around the same time.

The following section describes solutions to both of the aforementioned problems in turn—one suited to single-event-based highlights, and one suited to aggregating several successive events as highlight sequences.

Variety—Value Tradeoff:

To avoid producing a monotonous list of highlights that are all of high value but all broadly similar, one can apply a condition to the set of results produced whereby a minimum amount of variety is required. We use a user-set minimum entropy value to achieve this.

$$H = -\Sigma_{i=1}^{n} p_i \log p_i$$

where n is the number of distinct event types, $p_i$ is the probability that any event selected randomly from the set of events is event type i, and is equal to the number of events of type i in the list divided by the total number of events in the list.

Initially, the events with highest adjusted impact are included in the list of highlights. If the entropy for the event types in this list fall below the threshold, the event with next-highest adjusted impact that has not been included in the list is inserted. It replaces whichever event gives the resulting list maximum entropy. This process is repeated until the entropy condition is met, ensuring a certain amount of clip variety as specified by the user. FIG. 10 shows a coded example of how this can be implemented for a 10-clip highlight reel with a minimum H threshold of 1.0.

Event Interest:

Typically, in sports analytics each event is recorded with a single timestamp, resulting in a description of a game that includes a sequence of discrete instances in time. The interest that an event holds for a fan is not only in a single snapshot in time. Instead of assigning the entirety of the impact of an event to a discrete instant, one can smooth the distribution of each impact to give the Event of Interest, EI, a continuous function of both $I_{adj}(e)$ and time, $EI(I_{adj}(e), t)$.

The exact nature of this function may vary depending on the sport or the event. For example, when a great goal is scored in soccer, the interest for a fan is to see the instant of the goal, and the action that preceded the goal. An EI with a long left tail would accommodate this. Conversely, for a great hit in baseball, one only needs to see a second or two of the action that precedes the hit; most of the interest lies in the moments that follow the ball being hit. Here, a function with a longer right tail would be preferable.

Clip Length:

In many sports, a highlight package based only on individual events would not be effective: often, several events with varying amounts of interest to the viewer happen within a very short space of time. A single high-interest event may not merit fan interest; several medium-interest events in quick succession may be of more interest overall. One may want to vary the length of the clip depending on how many events of interest occur near to one another in time.

Now that one can represent the event interest as a continuous function in time, consider the occurrence of several events whose EI distributions overlap in time. Take the sum of every event's EI at each moment:

$$\sum_{e=1}^{n} EI(I_{adj}(e), t)$$

One can call the resulting value the Cumulative Event Interest, or CEI, where n is the total number of events and $I_{adj}(e)$ is the adjusted impact of the game event e. This function represents the cumulative interest of a game's events at every point in time and is a flexible tool for extracting highlights.

Figure 4:
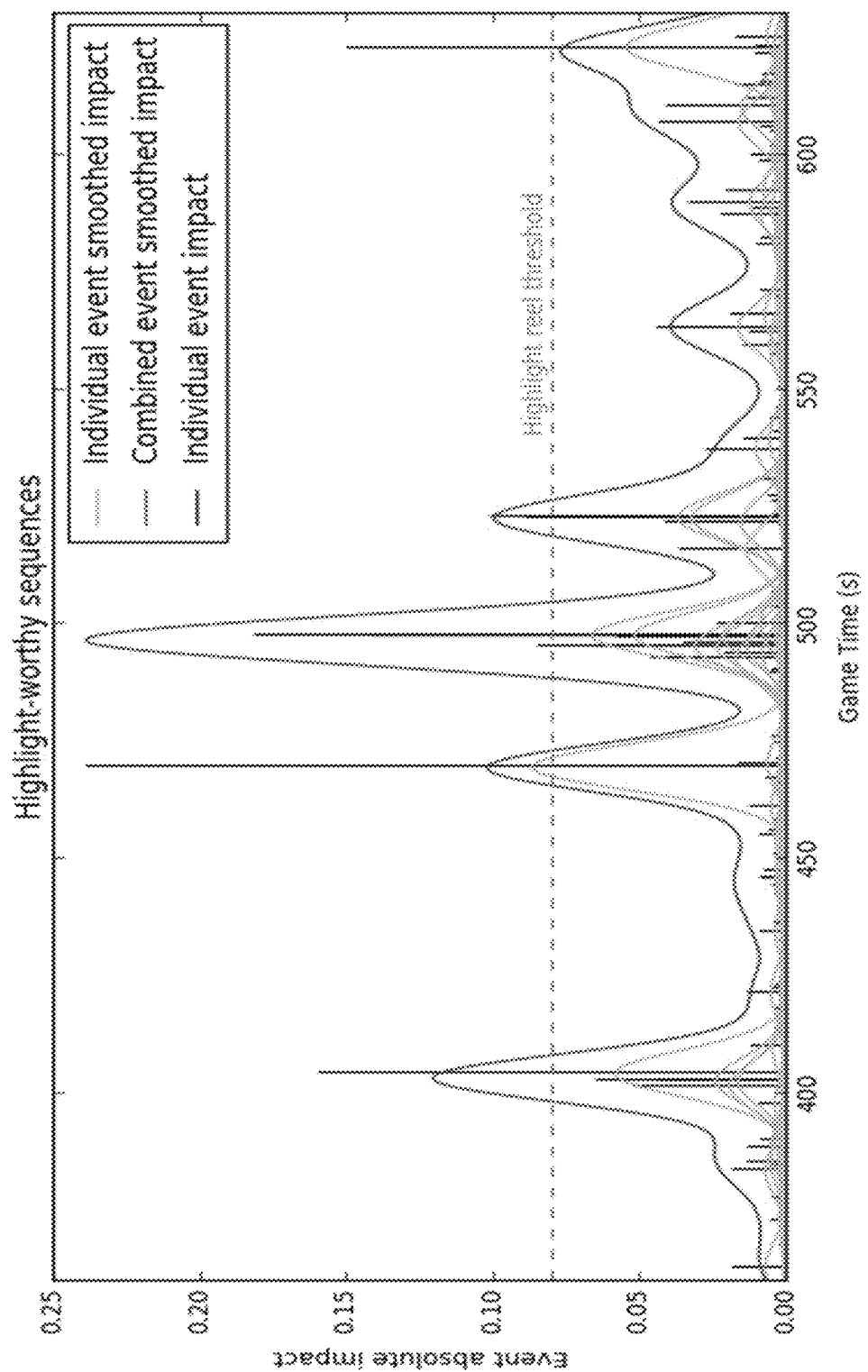
FIG. 4 is a graph showing cumulative event interest (CEI) of game events.

FIG. 4 shows the CEI of events with respect to time across a few minutes of an NHL hockey game. The height of the dark vertical lines represents the magnitude of each individual event's impact. The lower curves represent the EI of each event. The function may vary depending on the use-case; in this case the system can use a Gaussian function whose height is directly proportional to the absolute impact value. The upper curve is the sum of all EI, or the CEI, normalized to appear on the same scale as impact and individual EI.

It may be noted that the maximum of the CEI occurs at a different location from the maximum EI. This illustrates the fact that CEI relies on several high-impact events; a single high-impact event does not always merit a fan's interest.

Now that we have a function representing the level of interest at every moment in time, the process of highlight extraction is as simple as setting a minimum threshold for CEI. Any timeframe within which the minimum threshold is met is included in the highlight reel. The length of each clip is the difference between the time when the curve passes above the threshold, and the time when the curve passes back below the threshold. In other words, rather than each clip having the same length, clip length is dictated by the length of time a period of high interest is sustained without interruption. Alternatively, a user may require a fixed number of highlight clips or fixed amount of highlight time. Both cases can be automated by lowering the highlight reel threshold until it's reached the height at which the required number of clips or length of time passes above the threshold.

The Gaussian function used in FIG. 4 demonstrates another flexible component of the CEI: adjusting the standard distribution used to calculate event EI allows the user to control the trade-off between importance of individual events and importance of a sequence of events. As the standard deviation approaches zero, CEI approaches an identical representation to the non-continuous representations given by the discrete I values. On the other hand, a very large standard deviation spreads the interest of each event impact widely across the game, in which case the tool becomes better suited to extended highlights. Alternative (non-Gaussian) distributions are also possible if one prefers asymmetric tails or other features tailored to the sport in question.

Adjustment for Breaks in Continuous Play:

The CEI is effective in most cases during a continuous sport. One issue arises whenever a break in play occurs. Since a break in play is of no interest to a fan, it does not make sense for the EI of an event to carry across breaks in play. For example, if a goal occurs in the final second of the first half in a soccer game, this does not mean a user wishes to see the events that occur in the first second of the second half. The same is true for period breaks in hockey and breaks between plays in football.

A solution is first to limit the EI to the sequence of continuous play in which the event occurs.

$$EI(I_{adj}(e), t) = \begin{cases} 0 & \text{if } t \text{ not in } s, \\ EI(I_{adj}(e), t) & \text{if } t \text{ in } s \end{cases}$$

where s is the sequence of play in which the event e occurs. t refers to game time rather than actual clock time, so that breaks in play are ignored.

Now that there is no spillover of EI from one sequence to another, a second problem arises. At the beginning and end of each play sequence, several high-impact events may occur that are underrepresented by the CEI, simply because it occurs near a cutoff point limiting the EI of nearby events.

Figure 5:
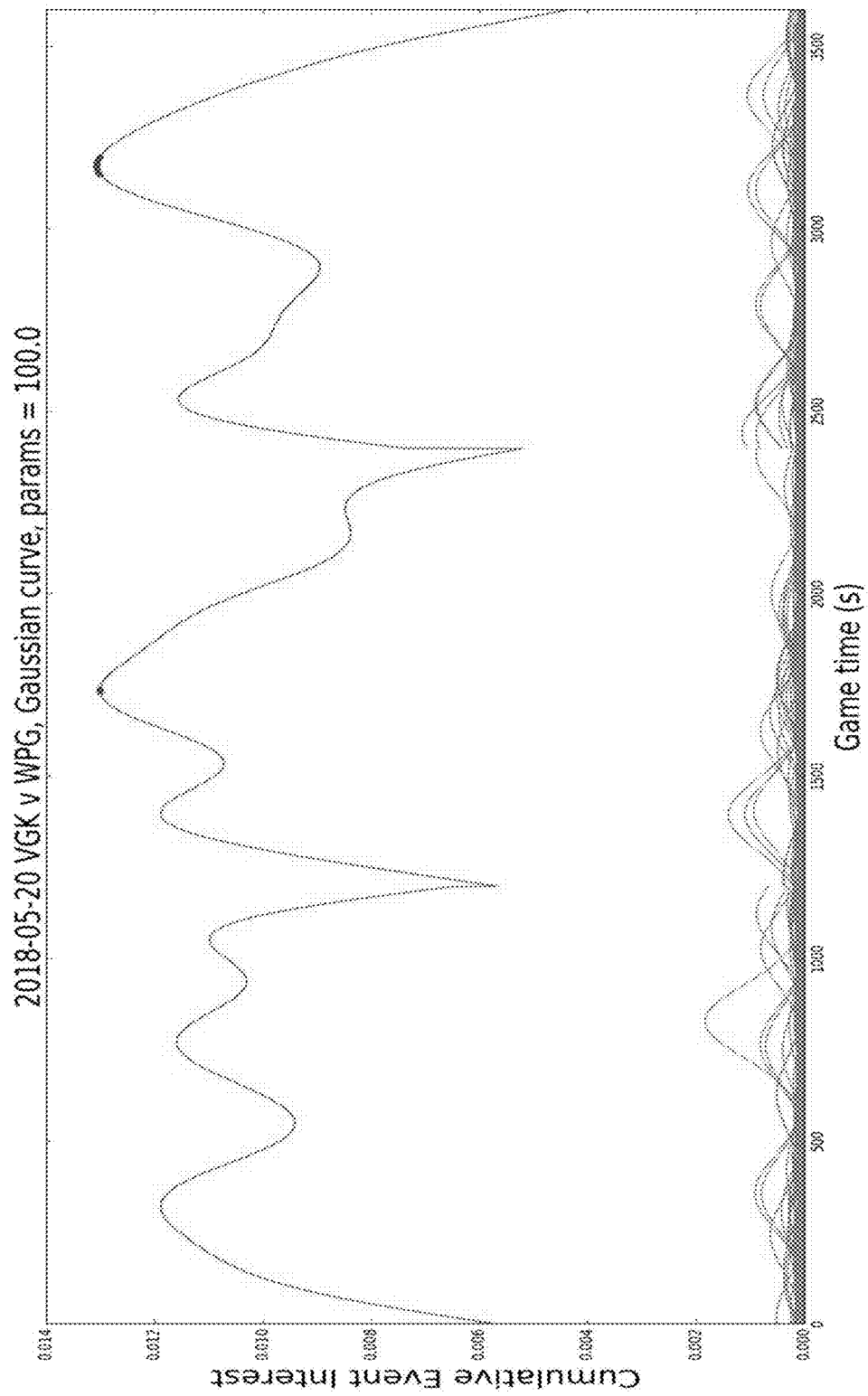
FIG. 5 is a graph demonstrating CEI after removing event interest (EI) spillover across breaks in play.

FIG. 5 demonstrates the issue with limiting EI spillover across breaks in play. The example is of a hockey game with two breaks in play: one between period 1 and period 2, and another between period 2 and period 3. Around 1200 and 2400 seconds, the CEI drops severely. The same occurs at the start and end of the games.

Figure 6:
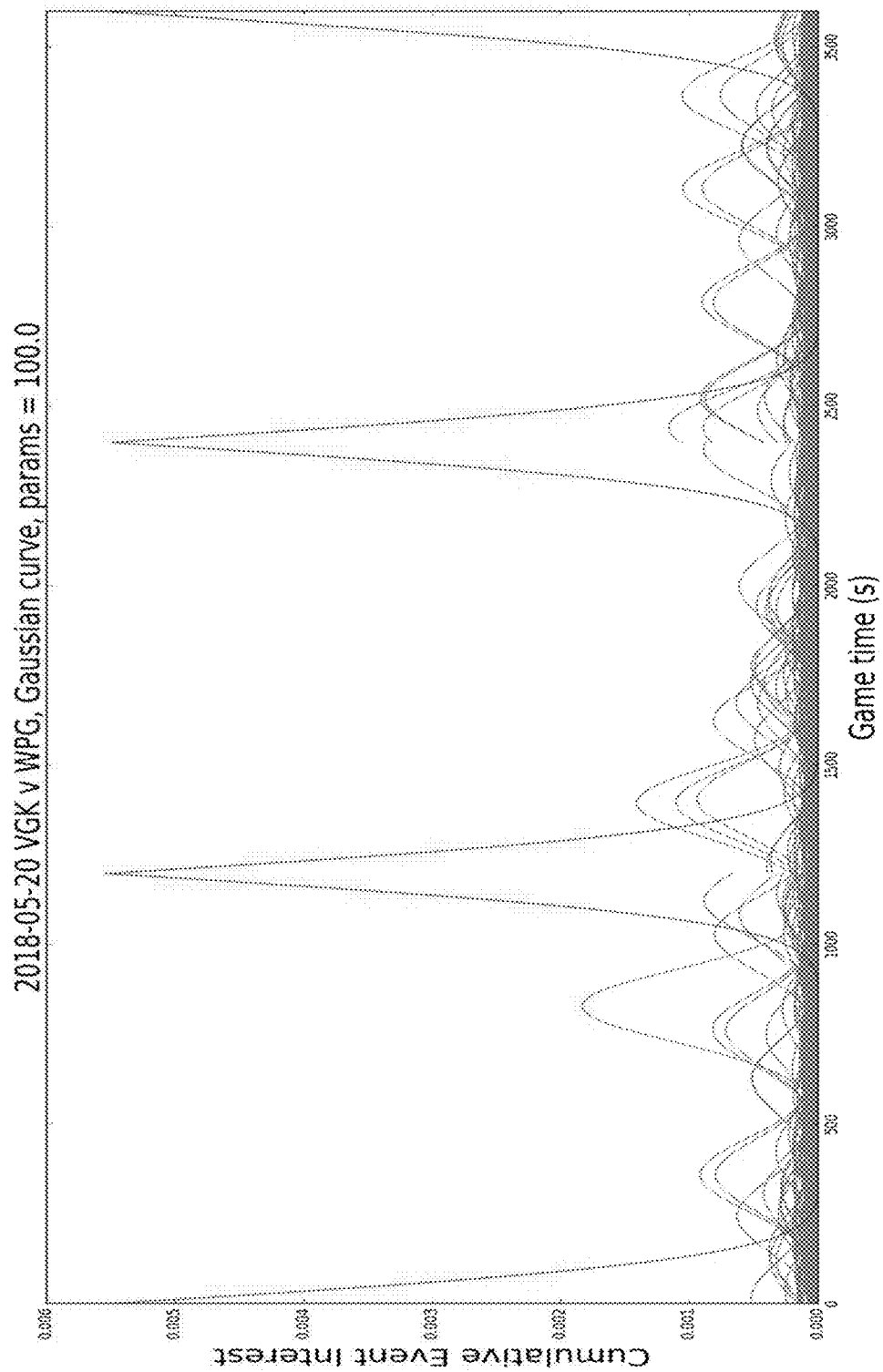
FIG. 6 is a graph showing CEI from imaginary average EI events before and after each play sequence.
Figure 7:
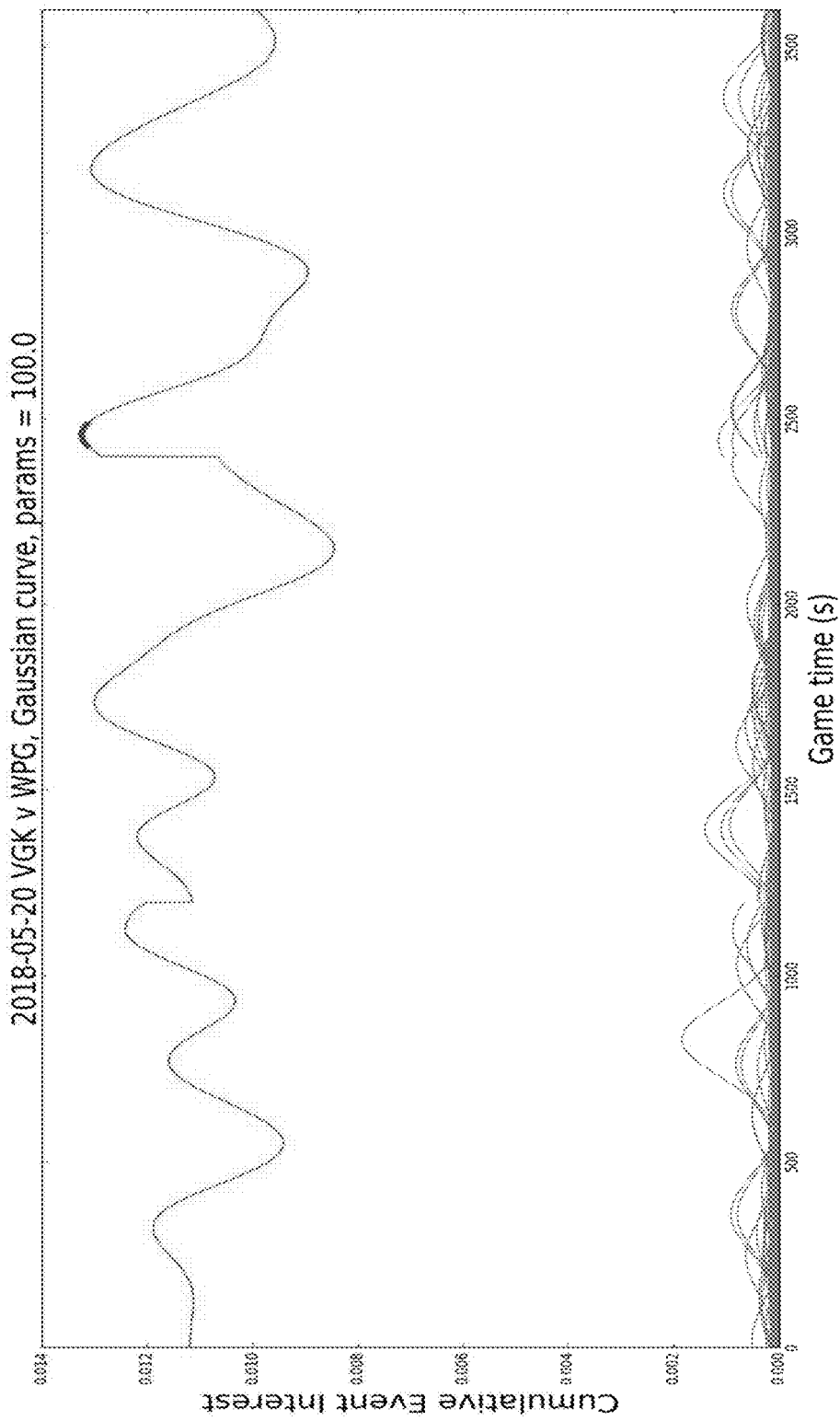
FIG. 7 is a graph showing CEI after removing EI spillover across breaks in play and boosting near the beginning and end of each period.

To correct for this, the system calculates the average per-second EI for the game of interest. The system effectively imagines each play sequence extending indefinitely into the past and future beyond its actual start and end times, with perfectly average EI throughout. The system calculates the resulting CEI and allows this to "spill over" into the play sequence. The result is a boost to EI that increases the closer the play is to the beginning or end of a play sequence. Because this boost is proportional to the average impact of the game, it does not unfairly affect the CEI at the beginning and end of play sequences one way or the other. The additional CEI generated using this method is shown in FIG. 6. The resulting CEI for the same game as FIG. 5 is shown in FIG. 7.

The highlight extraction technique can be applied to any sport. Here, the technique may be demonstrated by applying it to NHL hockey. Each event represents an action taken by a player in the game built from computer vision that extracts key information from hockey games. The highlight-reel extraction process is designed to be independent of the technique used to evaluate a game's actions. Here, the system can use a Markov model to evaluate each game state. Following the Markov Game Models in references [7] and [6], the game is described by a finite set of states, defined by the event type, location, outcome and team.

A set of contexts are described, defined by game period, score differential, manpower differential and which team's goalies are on the ice. The contexts are chosen with the help of hockey experts, based on which contextual information tends to have the greatest effect on players' behavior. The goal in defining contexts is to allow the model to distinguish between contexts that most affect the value of events within those contexts.

Each state is assigned a probability distribution representing the likelihood that the play will transition from that state into another. This probability distribution is equal to the count of transitions from the state into each successive state. Value iteration is applied, first to the home team and then to the away team. In the case of the home team, reward is set to 1.0 for a home goal state and 0.0 for all other states. In the case of the away team, reward is set to 1.0 for an away goal state and 0.0 for all other states. Goal and neutral zone faceoff are terminal states. This results in two values for each state, each value representing the probability that either the home team or the away team will score before the end of the current play sequence, where each play sequence begins with a faceoff and terminates with either a faceoff or a goal.

Single Event Highlights:

First, setting aside the results of EI and CEI and evaluating events based only on their $I_{adj}$, one can find useful results. Applying $I_{adj}$ to hockey, in order to demonstrate the usefulness of the measure the system can exclude shots and goals, events whose interest in a highlight reel are self-evident. Instead, the system can look at events whose impact can vary greatly and can be either positive or negative depending on the context: passes and blocks. The system ranks these events by their impacts. Table 1 and Table 2 below list certain events.

TABLE 1

$I_{adj}$ of most negative impact passes and blocks

| Name | $I_{adj}$ | Name | $I_{adj}$ |
|---|---|---|---|
| PIT Crosby Failed Pass North Cycle | −4.0% | WSH Holtby Failed Block Pass | −14.4% |
| PIT Rust Failed Pass to Slot | −3.8% | SJS Braun Failed Block Pass | −14.3% |
| WSH Kuznetsov Failed Pass to Slot | −3.8% | PHI Provorov Failed Block Pass | −14.3% |
| BOS DeBrusk Failed Pass to Slot | −3.8% | BOS McAvoy Failed Block Pass | −14.3% |
| TBL Stamkos Failed Pass to Slot | −3.7% | SJS Pavelski Failed Block Pass | −14.3% |

TABLE 2

$I_{adj}$ of highest positive impact passes and blocks

| Name | $I_{adj}$ | Name | $I_{adj}$ |
|---|---|---|---|
| WSH Kempny Pass to Slot | 11.0% | CBJ Jones Block Pass | 4.6% |
| WPG Chiarot Pass to Slot | 11.0% | WSH Eller Block Pass | 4.4% |
| PHI Gostisbehere Pass to Slot | 11.0% | WSH Eller Block Pass | 4.1% |
| BOS Pastrnak Pass to Slot | 11.0% | TBL Hedman Block Pass | 4.0% |
| MIN Dumba Pass to Slot | 11.0% | WSH Kuznetsov Block Pass | 4.0% |

Positive, Negative and Combined Impacts:

After testing several smoothing functions, it was found that for hockey highlights, the Gaussian function produces the most interesting results. Next, one can examine the effect of smoothing over a) the absolute impact of all events, b) the impact of positive impact events only, and c) the absolute impact negative impact events only.

Events with Positive and Negative Impact→This results in a highlight reel with plenty of swings in puck possession, such as when several shots occur near the net and the defending team is scrambling to win possession of the puck without success.

Only Events with Positive Impact→Limiting the sequence to positive impact events only produces the most exciting highlight reel with plenty of high danger chances and shots.

Only Events with Negative Impact→Limiting the sequence to negative impact events only, the result is a set of clips that feature moments that could have been big scoring opportunities but for an error—a player misses a reception, loses the puck in a dangerous position, etc.

Figure 8:
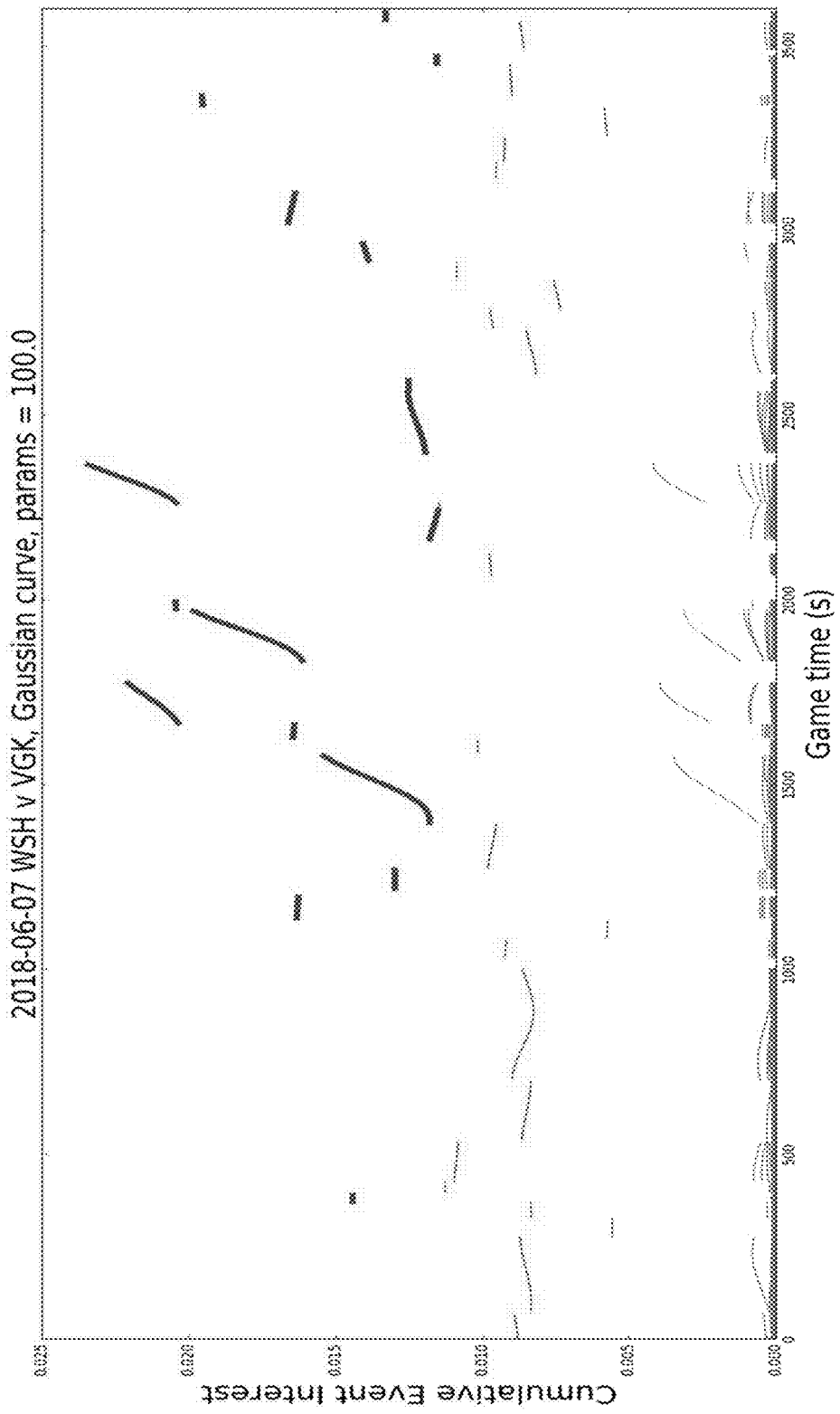
FIG. 8 is a graph showing CEI for a mini-game with a goal included.

Auto-Generated Mini-Game:

Mini-games are popular formats for fans to re-watch games. Typically, the games are shortened to about a third of their usual length, as in the popular "90 in 30" soccer format. The techniques described here can be modified to produce this format, simply by setting a high number of highlight seconds and a wide EI tail parameter. In this case, the system can treat every whistle as a break in play, rather than only treating intermissions between periods as such. The system can also increase the standard deviation of the Gaussian EI function to accommodate longer play sequences. The system can ignore any play sequences with less than 10 events. These result in a more fragmented-looking vizualisation as seen in FIG. 8.

Graphical Game Summary:

The graphical display of CEI is a useful tool for deciding what parameters to set for extracting game highlights, giving a sense of the most dramatic moments in a game.

Another use-case for this graphical representation is worth noting. Instead of producing a single CEI function over the course of a game, the system can produce two: one for each team. The greater the EI, the more dominant a team. Plotting both against each other produces a graph that acts as a simple, clear visual representation of the ebb and flow of a game over time.

Figure 9:
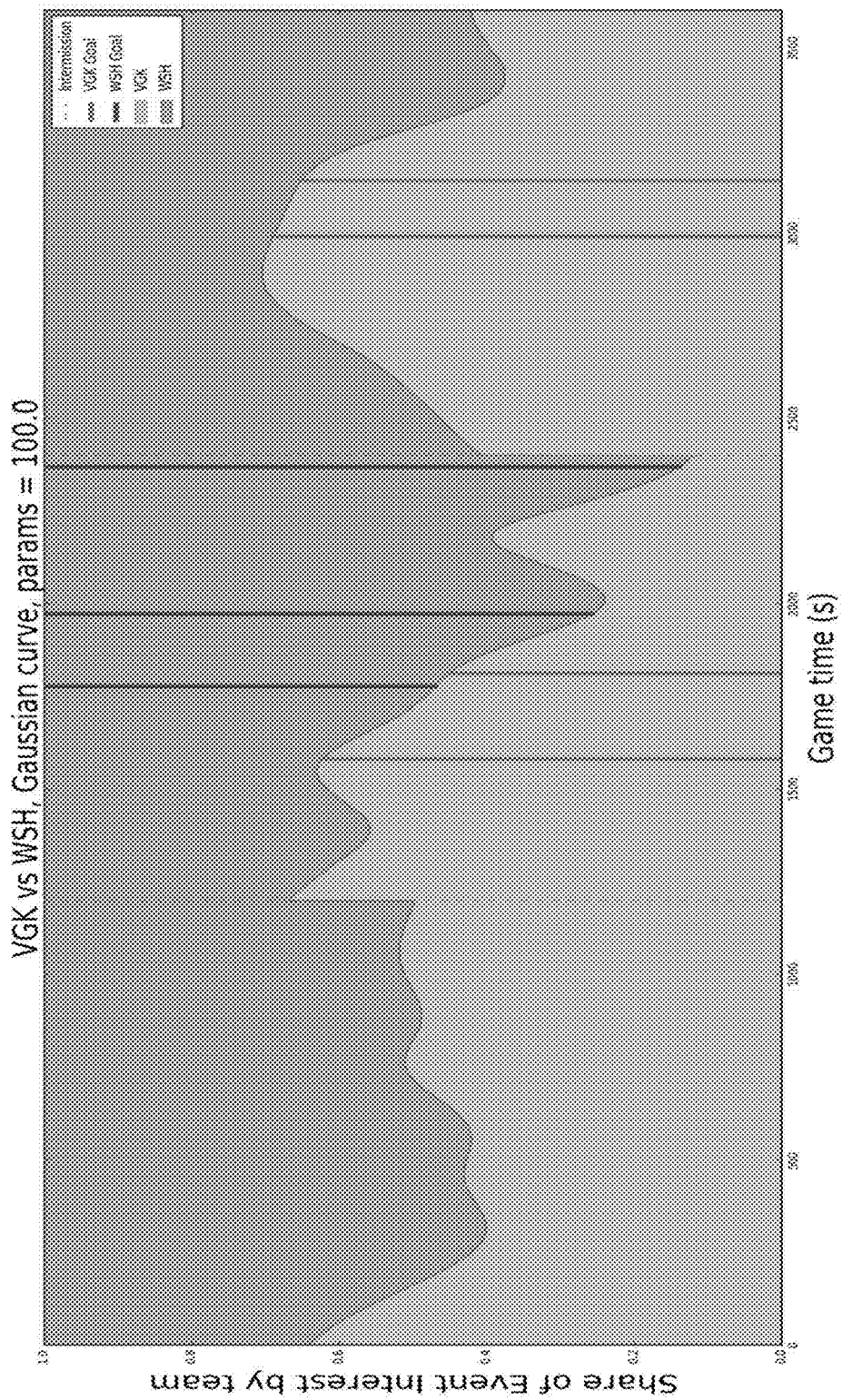
FIG. 9 is a graphical summary of a Vegas Golden Knights (VGK) vs Washington Capitals (WSH) game corresponding to game 5 of the NHL Stanley Cup final in 2017-2018 season.

While visual game summaries do already exist, they tend to rely on an aggregate of no more than a handful of basic measures, such as shots or goals. CEI allows us to plot a representation that accounts for all events in a game, while also removing the noise that would result from simply plotting discrete event values for each team. An example is shown in FIG. 9.

The system described herein includes a method for automatic highlight and lowlight generation that can be applied to many games and sports. This framework can accommodate a host of requirements, from the case of single-second social media clip reels to shortened mini-games. It has also been shown that the same approach can produce interesting visual narratives of a game.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system (e.g., analysis module), any component of or related to the system, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

REFERENCES

[1] Robert B. Gramacy, Matt Taddy, and Sen Tian. Estimating player contribution in hockey with regularized logistic regression. Journal of Quantitative Analysis in Sports, 9(1).
[2] Brian Macdonald: *An Improved Adjusted Plus-Minus Statistic for NHL Players*. MIT Sloan Sports Analytics Conference, 2011.
[3] Dan Cervone, Alexander DAmour, Luke Bornn, Kirk Goldsberry: "POINTWISE: Predicting points and valuing decisions in real time with NBA optical tracking data", *8th Annual MIT Sloan Sports Analytics Conference*, February, 2014.
[4] Guiliang Liu and Oliver Schulte. Deep reinforcement learning in ice hockey for context-aware player evaluation. IJCAI-ECAI-18, 2018.
[5] Stephen Pettigrew. Assessing the offensive productivity of NHL players using in-game win probabilities. *MIT Sloan Sports Analytics Conference*, 2015.
[6] Oliver Schulte, Mahmoud Khademi, Sajjad Gholami, Zeyu Zhao, Mehrsan Javan, and Philippe Desaulniers. A Markov game model for valuing actions, locations, and team performance in ice hockey. Data Mining and Knowledge Discovery, 31(6):1735-1757, 2017.
[7] Oliver Schulte, Zeyu Zhao, Mehrsan Javan, and Philippe Desaulniers. Apples-to-apples: Clustering and ranking NHL players using location information and scoring impact. MIT Sloan Sports Analytics Conference, 2017.
[8] Francine Chen, Matthew Cooper, John Adcock, System and method for video summarization US 2009/0080853 A1

The invention claimed is:

1. A method for summarizing a video comprising:
obtaining the video;
extracting a plurality of features describing the events from the video, wherein each event is defined by a single timestamp in the video;
determining quantitative values for each event by evaluating the plurality of features according to at least one evaluation criterion;
assigning one or more of the determined quantitative values to the events;
generating segments of the video by:
determining segment lengths based on representing the quantitative values of events in the video with a distribution having a profile over a video length, wherein the segment length is a function of the distribution with respect to time and the distribution profile is based on an underlying video context or respective event types; and
compiling a summary video using scores for the segments by assessing aggregated quantitative values for video times.

2. The method of claim 1, further comprising:
receiving information corresponding to individual player activities, team activities and game events, the location in space and time of the events or activities being generated automatically or manually;
generating the quantitative values for the individual activities and game events;
using the quantitative values of the events to generate performance metrics of the individual players and teams;
generating segments in the videos based on the performance metrics and assigning a score to each segment; and
compiling the summary video using the scores for the segments.

3. The method of claim 1, wherein for identifying important segments in videos for sport coaching, video recommendation and showing similar content, and wherein each segment is separated based on one of the plurality of features describing the events in the video the method comprises:
obtaining a model that quantitatively evaluates the events based on their desired outcomes and assigns an impact score to each segment; and generating a playlist of the segments with similar content that have similar impact scores.

4. The method of claim 1 further comprising using information entropy values to determine which generated segments to include in the generated summary videos.

5. The method of claim 1, wherein the segments can contain a sequence of consecutive events.

6. The method of claim 1, wherein the events are human actions, human-human interactions, human-object interactions, or object-object interactions.

7. The method of claim 1, wherein the evaluation criteria are defined by a user.

8. The method of claim 1, further comprising receiving information about the types of events and actions, such as a name, a label, or a description generated automatically or manually.

9. The method of claim 1, further comprising using a Markov decision process to determine the quantitative values for each event by modeling a sequence of the events and measuring the impact of each event according to at least one evaluation criterion.

10. The method of claim 1, further comprising using scoring goals, winning the game, shots on net, or possession time as the evaluation criteria for the sport game videos.

11. The method of claim 2, further comprising using impact values of the events in changing the win probability or scoring the next goal as an evaluation criteria for the sport game videos.

12. The method of claim 1, further comprising using a decision process model or a game model to assign quantitative values to each event or a sequence of events at a particular instance in space and time.

13. The method of claim 1, further comprising creating segments in the videos that are localized in time.

14. The method of claim 13, further comprising using game time information to identify continuous play, and generating video segments for summarization that exclude breaks by reference to the game time information.

15. A non-transitory computer readable medium comprising computer executable instructions for summarizing a video, comprising instructions for:
    obtaining the video;
    extracting a plurality of features describing the events from the video, wherein each event is defined by a single timestamp in the video;
    determining quantitative values for each event by evaluating the plurality of features according to at least one evaluation criterion;
    assigning one or more of the determined quantitative values to the events;
    generating segments of the video by:
    determining segment lengths based on representing the quantitative values of events in the video with a distribution having a profile over a video length, wherein the segment length is a function of the distribution with respect to time and the distribution profile is based on an underlying video context or respective event types; and
    compiling a summary video using scores for the segments by assessing aggregated a quantitative values for video times.

16. A system for summarizing a video, the system comprising a processor, memory, and an interface for obtaining videos, the memory storing computer executable instructions for:
    obtaining the video;
    extracting a plurality of features describing the events from the video, wherein each event is defined by a single timestamp in the video;
    determining quantitative values for each event by evaluating the plurality of features according to at least one evaluation criterion;
    assigning one or more of the determined quantitative values to the events;
    generating segments of the video by:
    determining segment lengths based on representing the quantitative values of events in the video with a distribution having a profile over a video length, wherein the segment length is a function of the distribution with respect to time and the distribution profile is based on an underlying video context or respective event types; and
    compiling a summary video using scores for the segments by assessing aggregated quantitative values for video times.

17. The system of claim 16, further comprising a database of video segments with associated quantitative scores.

* * * * *